No. 668,008. Patented Feb. 12, 1901.
W. CUNNINGHAM.
AUTOMATIC BOILER FEEDER.
(Application filed June 23, 1900.)
(No Model.) 2 Sheets—Sheet 1.
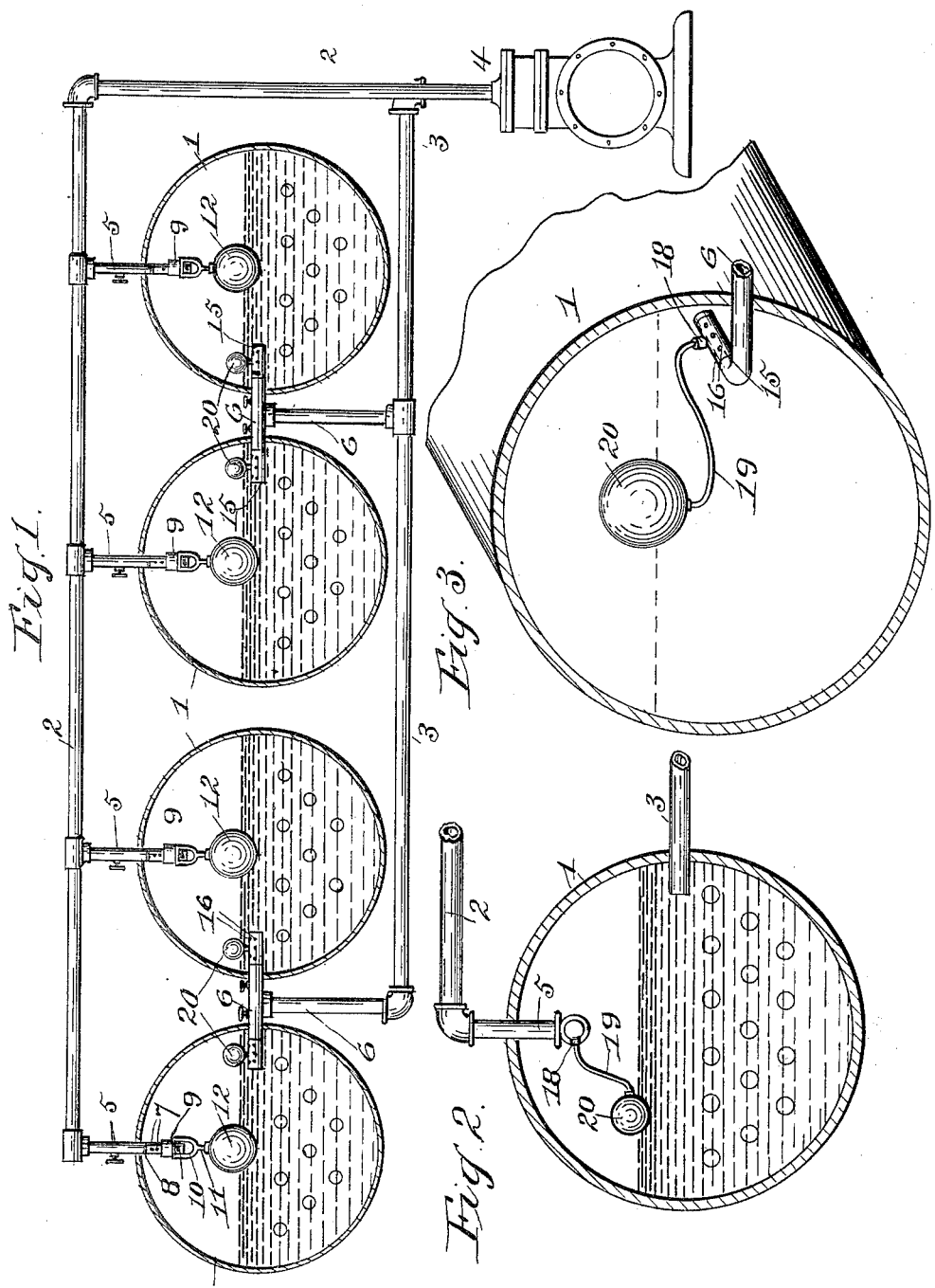
Witnesses
Inventor
William Cunningham
By C. J. Belt
Attorney No. 668,008. Patented Feb. 12, 1901.
W. CUNNINGHAM.
AUTOMATIC BOILER FEEDER.
(Application filed June 23, 1900.)
(No Model.) 2 Sheets—Sheet 2.
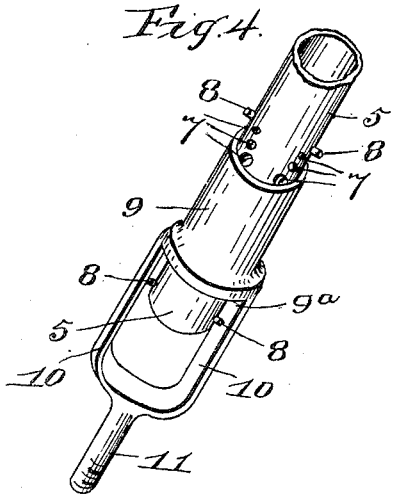
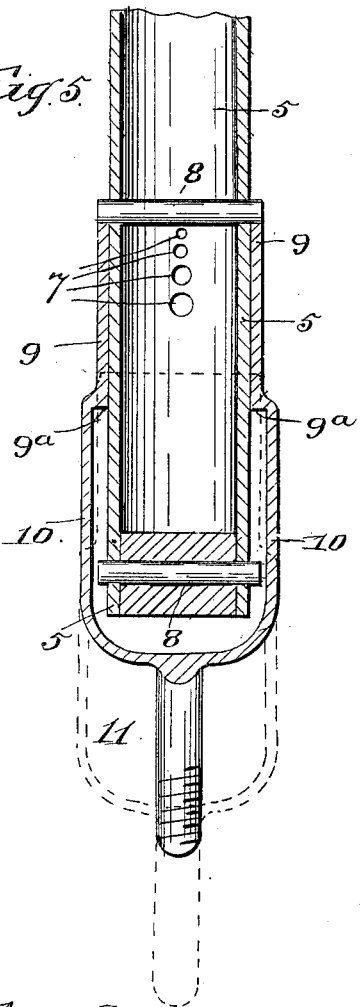
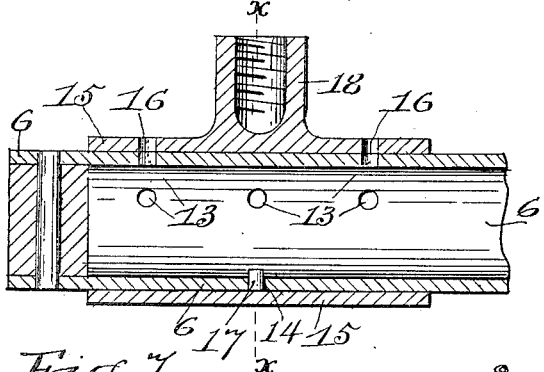
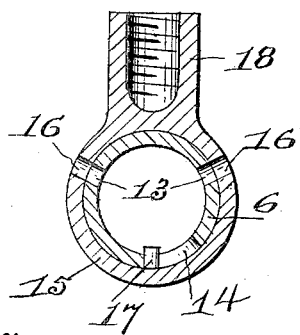
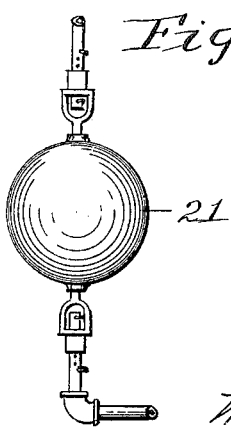
Inventor
William Cunningham
By C. T. Belt
Attorney
Witnesses
W. Whitman
W. F. Crossman

UNITED STATES PATENT OFFICE.

WILLIAM CUNNINGHAM, OF ALLENWOOD, PENNSYLVANIA, ASSIGNOR TO FRED. G. CUNNINGHAM, OF SAME PLACE.

AUTOMATIC BOILER-FEEDER.

SPECIFICATION forming part of Letters Patent No. 668,008, dated February 12, 1901.

Application filed June 23, 1900. Serial No. 21,318. (No model.)

*To all whom it may concern:*

Be it known that I, WILLIAM CUNNINGHAM, a citizen of the United States, residing at Allenwood, in the county of Union and State of Pennsylvania, have invented certain new and useful Improvements in Automatic Boiler-Feeders, of which the following is a specification.

This invention relates to boiler-feeders, and particularly to the class of feeders employing a float; and it is designed as an improvement upon my patent of July 27, 1886, No. 346,269.

One object of the invention is to provide a simplified and inexpensive feed device requiring no apparatus or number of elements or parts to effect the feeding, but in itself comprising the ends of the steam and water pipes which project into the boiler and which have perforations, apertures, slots, or similar openings controlled by a valve-sleeve operated by a float in the boiler and novel means to limit the movement of the sleeve.

A further object of the invention is to perforate the ends of the steam and water pipes ordinarily used and project them into the boiler and provide them with a slidable valve-sleeve connected with floats to slide the sleeve and open and close the apertures, and novel means to limit the movement of the sleeve. All devices for this purpose known to me consist of extensive apparatus having casings, cylinders, pistons, and many other parts to operate valves and valve mechanisms. It is my aim to obviate and overcome the objections found in such devices and to make the ends of the water and steam pipes projecting into the boiler carry the valve-sleeve and coöperate with it, and provide non-lever means for limiting the movement of the sleeve to effect the feeding.

The invention consists in the novel construction and arrangement of parts, and resides, essentially, in a valve composed of the ends of the ordinary steam and water pipes projecting into the boiler, a valve-sleeve worked on said pipe ends by floats connected to the sleeve, and a non-lever means for limiting the movement of the sleeve.

In the accompanying drawings, forming part of this application, Figure 1 is a sectional view of a battery of boilers with my invention applied. Fig. 2 is a similar view showing my invention applied to a single boiler. Fig. 3 is a perspective view of the water-pipe valve. Fig. 4 is a perspective view of the steam-valve. Fig. 5 is a sectional view of the steam-valve, showing in dotted lines its movable position. Fig. 6 is a longitudinal sectional view of the water-valve. Fig. 7 is a section of the water-valve on the line $xx$, Fig. 6. Fig. 8 is an elevation of a modification.

The same numeral references denote the same parts throughout the several views of the drawings.

The boilers 1 have a steam-pipe 2 and a water-pipe 3 connecting them with a pump 4. The steam-pipe 2 has ordinary steam-pipes 5 projecting into the boilers, and the water-pipe 3 has T-pipes 6 projecting into the boilers. The ends of the pipes 5 in the boilers have closed ends provided with perforations or apertures 7 and stop-pins 8 above and below the perforations. Loosely mounted on the said pipe ends between the stop-pins is a non-perforated sleeve 9, having shoulders $9^a$ and arms 10, terminating in a screw-stem 11, which is attached to a closed float 12. There may be two or more sets of the apertures in the pipe ends, and they are of graduated sizes, or in lieu thereof the pipe ends may have slots of proper size. These pipe ends and the sleeves constitute the steam-valves entirely and completely, and it is obvious that the rise and fall of the floats will slide the sleeve vertically over the apertures to close and open them, the stop-pins controlling the stroke of the sleeves.

The water-valves comprise the closed ends of the water-pipes 6, having perforations or suitable openings 13 and a slot 14, and a sleeve 15, having perforations 16 to register with the perforations 13 and loosely mounted to slide or oscillate on the said water-pipe ends. The sleeve 15 has an internal pin 17 working in the slot 14 to limit the movement of the sleeve, and the latter is provided with a screw-lug 18, to which is attached a curved rod 19 of a closed float 20. It is obvious that upon the rise and fall of the float it will turn the sleeve to open and close the pipe-apertures, simultaneously reducing the steam to the pump and checking the water to the boiler.

In Fig. 2 only the steam-valve is employed, as the water-valve is not required on single boilers; but the construction and operation of this steam-valve are the same as those hereinbefore described.

Referring to the modification shown in Fig. 8, the float 21 is provided at the bottom with a duplicate of the steam-valve at the top, which bottom valve forms the water-valve.

It will be seen that I loosely mount each sleeve upon the outside of the perforated pipe ends without casings, chambers, levers, or any other devices commonly used, so that I am enabled to take the ordinary pipe, perforate and plug its end, and mount thereon the sleeve, and the valve is complete.

Having thus described my invention, what I claim as new, and desire to secure by Letters Patent, is—

1. In a boiler-feeder, the combination, with the boiler-pipe having perforations and a slot and extending into the boiler, of a perforated sleeve loosely mounted on said pipe end and having an internal pin engaging the slot to limit the movement of the sleeve, and a float connected to the sleeve to operate the latter.

2. The combination, with a battery of boilers, and the water and steam pipes thereof, of a pipe having a perforated end extending from the steam-pipe into each boiler, pipes having perforated ends extending from the water-pipe between certain of the boilers and discharging into the latter in pairs, a sleeve loosely mounted on the perforated pipe ends, a float attached to each sleeve, and means carried by the perforated pipe ends to limit the movement of the sleeves.

In witness whereof I hereunto set my hand in the presence of two witnesses.

WILLIAM CUNNINGHAM.

Witnesses:
J. ROSS CALHOUN,
HENRY T. BRIGHT.